(12) United States Patent
Tan et al.

(10) Patent No.: US 8,352,764 B2
(45) Date of Patent: Jan. 8, 2013

(54) DYNAMIC SQUELCH DETECTION POWER CONTROL

(75) Inventors: Sin Tan, Portland, OR (US); Sivakumar Radhakrishnan, Portland, OR (US); Bruce A. Tennant, Hillsboro, OR (US); Jasper Balraj, Beaverton, OR (US); Altug Koker, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1127 days.

(21) Appl. No.: 12/286,188

(22) Filed: Sep. 29, 2008

(65) Prior Publication Data

US 2010/0081406 A1    Apr. 1, 2010

(51) Int. Cl.
    *G06F 1/32*      (2006.01)
    *G06F 1/26*      (2006.01)

(52) U.S. Cl. ........ 713/320; 713/300; 713/310; 713/323; 713/324

(58) Field of Classification Search .................. None
See application file for complete search history.

(56) References Cited

U.S. PATENT DOCUMENTS

| | | | |
|---|---|---|---|
| 2006/0023633 A1 | 2/2006 | Caruk et al. | |
| 2006/0184809 A1* | 8/2006 | Kojou et al. | 713/300 |
| 2008/0233912 A1* | 9/2008 | Hunsaker et al. | 455/219 |
| 2008/0235528 A1* | 9/2008 | Kim et al. | 713/324 |
| 2010/0081406 A1* | 4/2010 | Tan et al. | 455/218 |
| 2010/0332868 A1* | 12/2010 | Tan et al. | 713/310 |
| 2011/0060931 A1* | 3/2011 | Radhakrishnan et al. | 713/340 |

OTHER PUBLICATIONS

Chinese Patent and Trademark Office, Office Action mailed Aug. 31, 2011, in Chinese application 200910204732.1.

Mohammad Kolbehdari, et al., Intel Technology Journal, vol. 09, Issue 01, "The Emergence of PCI Express* in the Next Generation of Mobil Platforms," Feb. 17, 2005, pp. 21-34.

German Patent and Trademark Office, Office Action mailed Apr. 4, 2012, in German application 10200904269.8-53.

\* cited by examiner

*Primary Examiner* — Tanh Nguyen

(74) *Attorney, Agent, or Firm* — Trop, Pruner & Hu, P.C.

(57) ABSTRACT

In one embodiment, the present invention includes power control logic for squelch detection circuitry to enable selective enabling of one or more squelch detection circuits of an interconnect interface in a low power mode. The logic may include a squelch mode control register to select a first mode or a second mode of power control, a second register coupled to the squelch mode control register to receive software settings to indicate which squelch detect circuit(s) to disable in a low power state of the interconnect, and a detector to dynamically detect a logical lane zero of the interconnect in the second mode. Other embodiments are described and claimed.

17 Claims, 4 Drawing Sheets

DYNAMIC SQUELCH DETECTION POWER CONTROL

BACKGROUND

Modern computer systems are typically formed of many semiconductor components that can communicate together via various interconnects such as present on a circuit board. One common such interconnect mechanism, e.g., for incorporating peripheral devices such as a graphics card, is a Peripheral Component Interconnect Express (PCIe™) protocol in accordance with links based on the PCI Express™ Specification Base Specification version 2.0 (published Jan. 17, 2007) (hereafter the PCIe™ Specification). Such an interconnect can be formed of multiple layers, including a transaction layer, a link layer, and a physical layer.

To reduce power consumption when communications are not occurring on a given interconnect, various mechanisms can be provided. If no communications are likely to occur for some time, the interconnect can be placed in a low power state in which various interconnect circuitry is disabled.

To determine when impending PCIe™ traffic is about to occur when in an idle/sleep condition, squelching is a PCIe™ physical layer input/output (I/O) function to detect such traffic. Squelch logic attempts to detect voltage in receive pins of the interconnect to sense activity and prepare a link layer transaction state machine for proper operation to exit from the electrical state (EL) or lower power state. The squelch logic in the I/O circuit typically includes analog differential amplifiers, integrators and other miscellaneous digital logic. However, such squelch logic can consume significant power, as typically the squelch logic is provided for each lane of an interconnect. As the number of lanes increases, so too does the total squelch power, which can manifest as a substantial portion of the idle power budget, particularly in the low power market.

DETAILED DESCRIPTION

Figure 1:
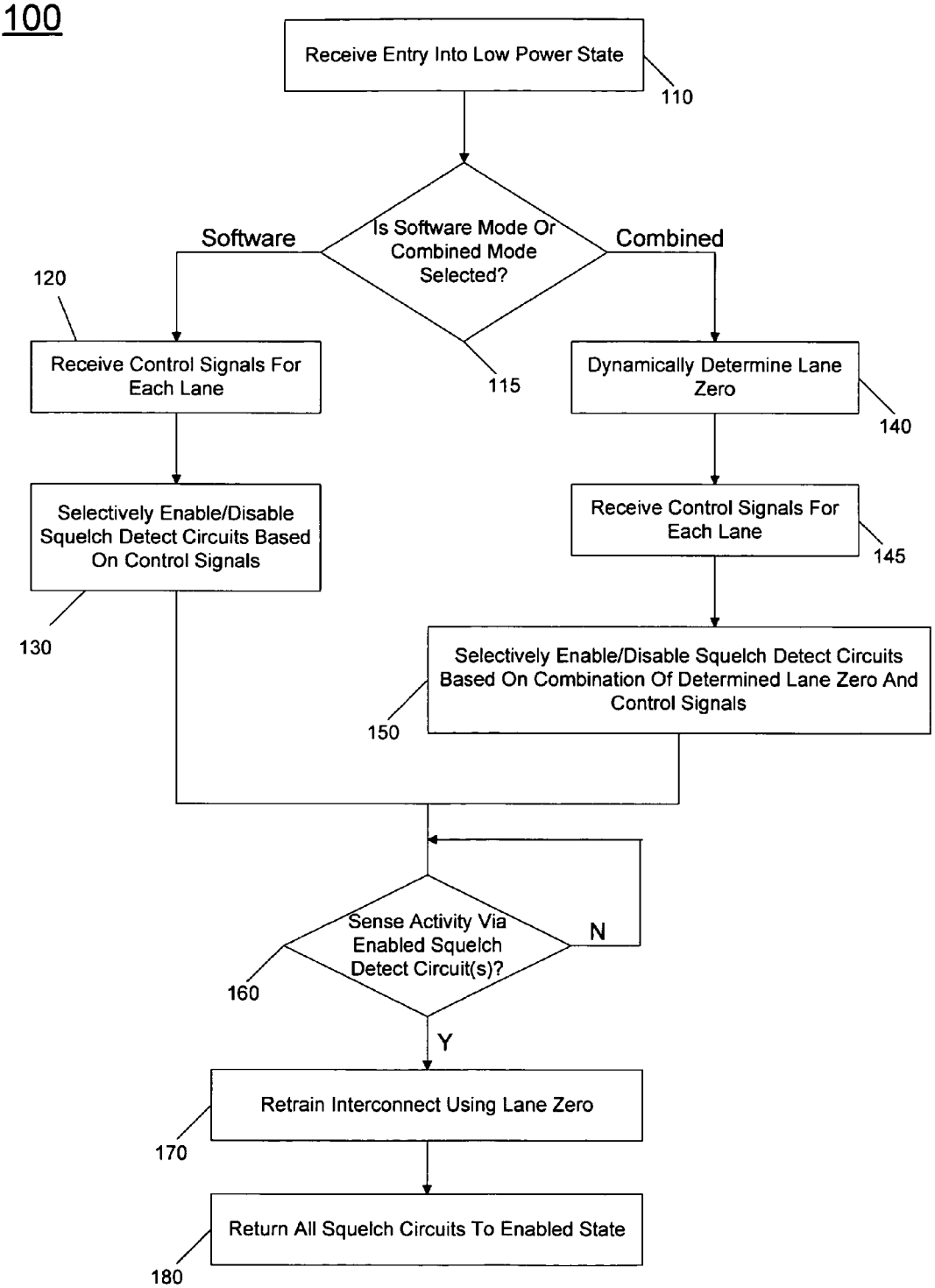
FIG. 1 is a flow diagram of a method in accordance with one embodiment of the present invention.

In various embodiments, squelch logic of an interconnect can be selectively enabled to reduce power consumption. More specifically, in various embodiments a semiconductor device such as a processor including an integrated memory controller and I/O controller may have internal (i.e., on-die) interconnects between processor circuitry and the controller circuitries. Such interconnect circuitry may include squelch control logic to selectively enable or disable squelch circuitry associated with one or more lanes of a given interconnect. In various embodiments, as will be discussed below such squelch control can be dynamic and can be controlled both via hardware and software to provide improved squelch reliability, while reducing power consumption.

Various embodiments can improve idle power of a chipset or multi-core processor (MCP) component by selectively enabling squelch detection circuitry in a physical layer of an interconnect. Still further, full dynamic isolation of physical and link layers can be provided to handle lane degradation, lane reversal mode and any link width of plug-in cards (N, 1). Thus as will be described further below, rather than a fixed lane to remain powered on, in various implementations a dynamic selection of one or more lanes to be selectively enabled for squelch detection can be provided. Still further, embodiments include a software configurable scheme that can increase squelch reliability for tackling board routing issues such as electromagnetic interference (EMI), or other noise that may affect squelch detection.

For optimizing squelch power, a physical layer may be controlled to take into consideration a number of conditions such as lane degradation, lane reversal modes and for detecting a logical lane zero (0) in the interconnect to establish the negotiated link width and enable its operation. Once logical lane 0 is detected, the squelch for the rest of the lanes (remaining) can be turned off. For subsequent transitions to and from a low power state, this detected logical lane 0 will be enabled for squelch operation.

In one embodiment, a squelch control circuit can include a state machine that dynamically detects lane 0, irrespective of cards, link width, degradation and lane reversal patterns via a PCIe™ training set (TS) pattern. Thus on each link training that occurs, the state machine operates through detection, polling, symbol lock and identification states to dynamically determine the logical lane zero of the link. Such state machine can be enabled through a control register and operate to disable squelch power to other lanes 2 to N−1, e.g., such that when the next exit from the idle state happens, the system works normally.

In some implementations, a control circuit can be both hardware and software controlled. The hardware scheme uses N-bits of control, e.g., through flip-flops for directing power to the individual lanes for each squelch circuit. The hardware state machine selectively enables/disables power based on an algorithm. In addition, software can intervene to enable power for a larger subset of lanes, if increased reliability is a concern or when this dynamic feature is disabled to thus trade power for better squelch reliability.

Table 1 below calculates the net savings with the hardware (dynamic) and software only mode, compared to no optimization for a variety of configurations.

TABLE 1

| Number of Cards | Negotiated Link Width | \_ | \_ | \_ | \_ | \_ | \_ | Physical Lanes | \_ | \_ | \_ | \_ | \_ | \_ | \_ | \_ | SW | Total Power Saved (SW) | HW | Total Power Saved (HW) |
|---|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | | | | |
| 1 | X16 | 0 | 1 | 2 | 3 | 4 | 5 | 6 | 7 | 8 | 9 | 10 | 11 | 12 | 13 | 14 | 15 | | | | |
| 1 | X16 | 15 | 14 | 13 | 12 | 11 | 10 | 9 | 8 | 7 | 6 | 5 | 4 | 3 | 2 | 1 | 0 | 14/16 | 80.00% | 15/16 | 90.00% |
| 2 | X8 | 0 | 1 | 2 | 3 | 4 | 5 | 6 | 7 | 0 | 1 | 2 | 3 | 4 | 5 | 6 | 7 | | | | |
| 2 | X8 | 7 | 6 | 5 | 4 | 3 | 2 | 1 | 0 | 7 | 6 | 5 | 4 | 3 | 2 | 1 | 0 | 12/16 | 70.00% | 14/16 | 85.00% |

TABLE 1-continued

| Number of Cards | Negotiated Link Width | \multicolumn{16}{c}{Physical Lanes} | | | | | | | | | | | | | | | | SW | Total Power Saved (SW) | HW | Total Power Saved (HW) |
|---|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | | | | |
| 4 | X4 | 0 | 1 | 2 | 3 | 0 | 1 | 2 | 3 | 0 | 1 | 2 | 3 | 0 | 1 | 2 | 3 | | | | |
| 4 | X4 | 3 | 2 | 1 | 0 | 3 | 2 | 1 | 0 | 3 | 2 | 1 | 0 | 3 | 2 | 1 | 0 | 8/16 | 50.00% | 12/16 | 75.00% |
| 16 | X1 | 0 | 0 | 0 | 0 | 0 | 0 | 0 | 0 | 0 | 0 | 0 | 0 | 0 | 0 | 0 | 0 | 0/16 | 10.00% | 0/16 | 15.00% |

As can be seen in Table 1, the net effective power savings can be 90% for a single ×16 configuration. Based on the I/O power calculations a substantial savings can be realized. For example, it is estimated that in one implementation each squelch detection circuit consumes approximately 0.011 Watts when enabled, leading in a 20-lane configuration to a total squelch power of 220 milliwatts (mW). In light of Table 1, savings of 90% can thus lead to approximately 200 mW of power savings.

Referring now to FIG. 1, shown is a flow diagram of a method in accordance with one embodiment of the present invention. Method 100 may be used to control squelch detection circuits of an interconnect. In one embodiment, the logic to perform method 100 may be implemented in squelch control logic of an interconnect, such as present in an integrated I/O controller or integrated memory controller associated with a multi-core processor in which the integrated controllers are integrated on the same die as the processor.

As shown in FIG. 1, method 100 may begin by receiving an indication of an entry into a low power state (block 110). The indication may come from various power management sources, such as an operating system or an active state power management (ASPM) software. For example, the logic may receive an indication that the link is not being used and accordingly is to enter into a given low power state, e.g., a L1 or L2 or lower such power state.

Then it may be determined whether a software mode of operation or a combined mode of operation is selected (diamond 115). As one example, a configuration register may indicate whether the mode is to be software controlled, or a combination of hardware and software control is selected. As shown in FIG. 1, if software control is indicated control passes to block 120, where control signals may be received for each lane. For example, such control signals may be received from software in a configuration register and based on such information squelch detect circuits, which may be associated with each of the lanes, may be selectively enabled/disabled (block 130). For example, in one implementation a single lane, e.g., a logical lane zero or a physical lane zero may have its squelch detect circuit enabled, while all other lanes' circuits are disabled. In this way, reduced power consumption can be realized while in a low power state, as only a single lane's squelch detect circuit is enabled. Note that because such an implementation is software controlled additional squelch detect circuits may be enabled, based on a given system to accommodate various board routing (including the interconnect), noise or other issues. That is, the software control may select more than one lane's squelch detection circuit for operation to accommodate such issues, for example, one or more other lanes that are at least a predetermined distance from the lane zero. Thus even when a given board has timing issues due to routing or other reasons, proper squelch operations occur by enabling more than one such circuit.

Still referring to FIG. 1, if instead a combined mode of operation is indicated, control passes to block 140 where the logical lane zero may be dynamically determined. While the scope of the present invention is not limited in this regard, such dynamic determination may be performed during configuration or other link retraining time based on a training pattern to thus indicate which of the multiple lanes is the logical lane zero. However, because of dynamic system conditions, this logical lane indication may vary over time. Still further, in a combined mode of operation control signals for each lane may be received (block 145), such as discussed above at block 120. Based on this information, i.e., the dynamically determined logical lane zero and the received control signals, the squelch detect circuits may be selectively enabled/disabled (block 150). Thus in either a software or a combined hardware/software approach only a single one or a small number of squelch detect circuits may be enabled when the interconnect is in a low power state.

Operation of the interconnect in the low power state may continue for some time, if no activity is occurring. Referring still to FIG. 1, it may be determined by the one or more enabled squelch detect circuits whether activity is sensed (diamond 160). If so, control passes to block 170, where the interconnect may be retrained using the logical lane zero. Finally, all squelch circuits may be returned to their enabled state (block 180) and normal link traffic may proceed on the now-enabled interconnect. While shown in this particular implementation in the embodiment of FIG. 1, the scope of the present invention is not limited in this regard.

Figure 2:
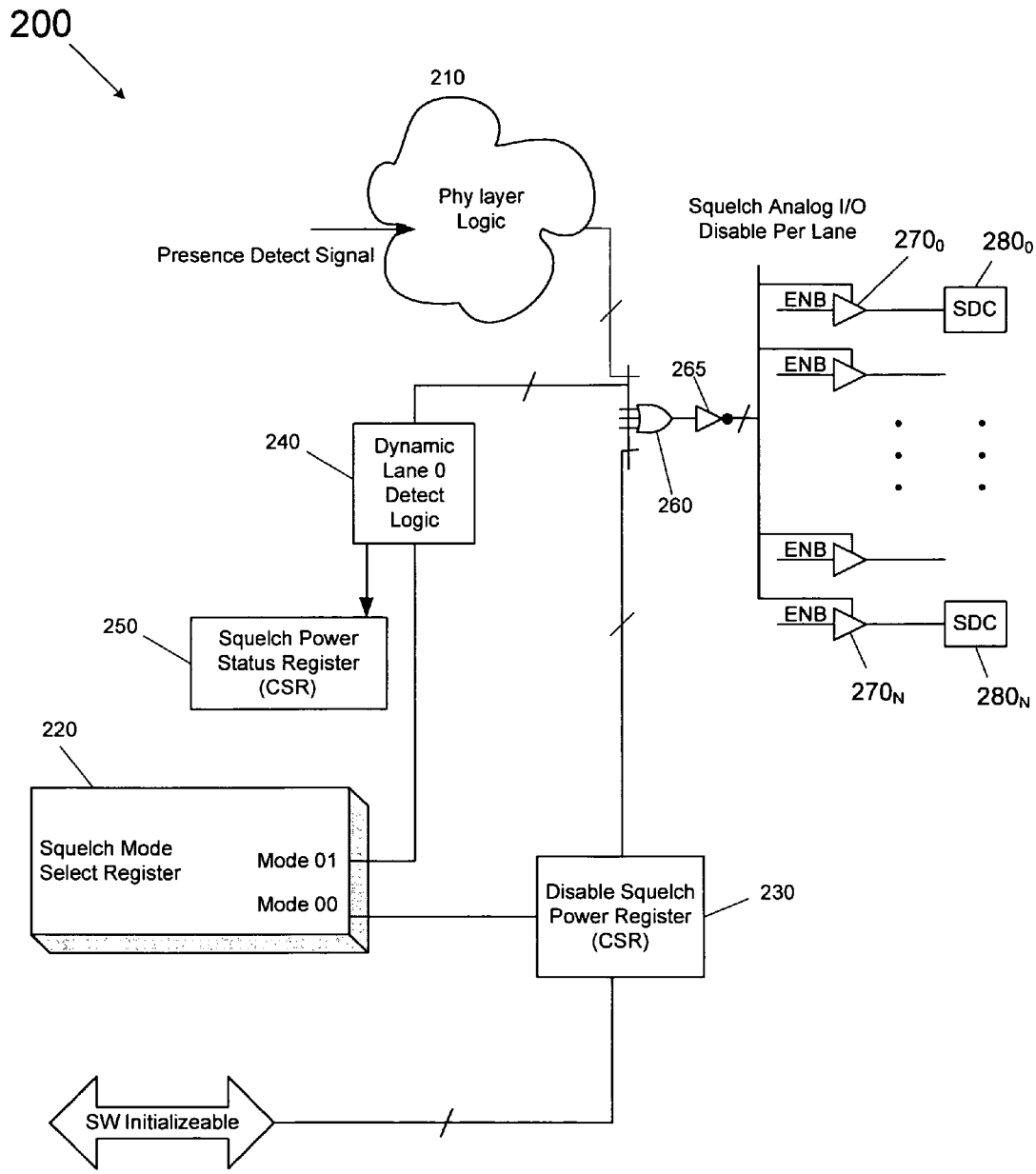
FIG. 2 is an implementation of squelch control logic in accordance with one embodiment of the present invention.

Referring now to FIG. 2, shown is an implementation of squelch control logic in accordance with one embodiment of the present invention. As shown in FIG. 2, logic 200 may be implemented in circuitry of an interconnect, although in some embodiments such logic may be implemented in software or firmware or combinations thereof. Logic 200 may include a squelch mode select (SMS) register 220, which may be a control register such as a configuration and status register (CSR). Based on the setting of this register, a combined hardware/software mode or a software only mode may be selected. As shown in FIG. 2, for mode 00 the logic may be fully software controlled via a disable squelch power register 230, which can be programmed under control of software to enable/disable squelch power to any one of selected squelch detect circuits (SDCs) $280_0$-$280_n$ (generically SDC 280). In one embodiment, when a given bit of the register (e.g., received from software) corresponding to a lane is at a logic low, full power is provided for that SDC 280, while when the bit is at a logic high, the bias voltage for the corresponding SDC may be disabled.

Instead during the combined mode, as indicated by a mode 01 setting of SMS register 220, dynamic lane zero detect logic 240 may be enabled to dynamically detect the logical lane zero, irrespective of lane width reversal and degradation. In one embodiment, logic 240 may output a logic low signal for the indicated logic zero lane and a logic high value to disable all other lanes. Using dynamic lane configuration, an interconnect can be reconfigured for various operations modes. For example, in one implementation, the first or last physical lane can be set as the logical zero lane, but this logical lane zero can otherwise be configured to be a different physical lane, such as a lane seven, or another such lane. Logic 240 may thus detect which lane is the logical lane zero, regardless of the dynamic operation of the interconnect. As shown, the identified dynamically detected logical lane zero may also be provided to a squelch power status register 250, which may be accessed for use in debug operations. Note that in this combined mode, the output of logic 240 and the control bits from disable squelch power register 230 may be combined in OR logic 260, along with an output of a physical layer logic 210, as described below. In this way, improved reliability in hardware mode may be used to increase squelch coverage if needed.

If physical layer logic 210 determines, based on a lack of a presence detect signal for a given port, that such port is not present, physical layer logic 210 may output a squelch analog I/O disable signal. The combined output of OR logic 260 is thus high if any of the inputs are high, identifying that the corresponding lane should have its SDC disabled. Thus the output of OR gate 260 is inverted in inverter 265, which when high acts as an enable signal to drive a corresponding one of a plurality of drivers $270_0$-$270_n$ (generically drivers 270), each of which is coupled to enable a corresponding SDC 280. In one example, each SDC 280 may receive a differential input signal from the physical lane, i.e., signal data in differential form, and if activity is detected on the lane, the circuit may generate an active output signal, which means that the lane is active. While shown with this particular implementation in the embodiment of FIG. 2, the scope of the present invention is not limited in this regard.

Figure 3:
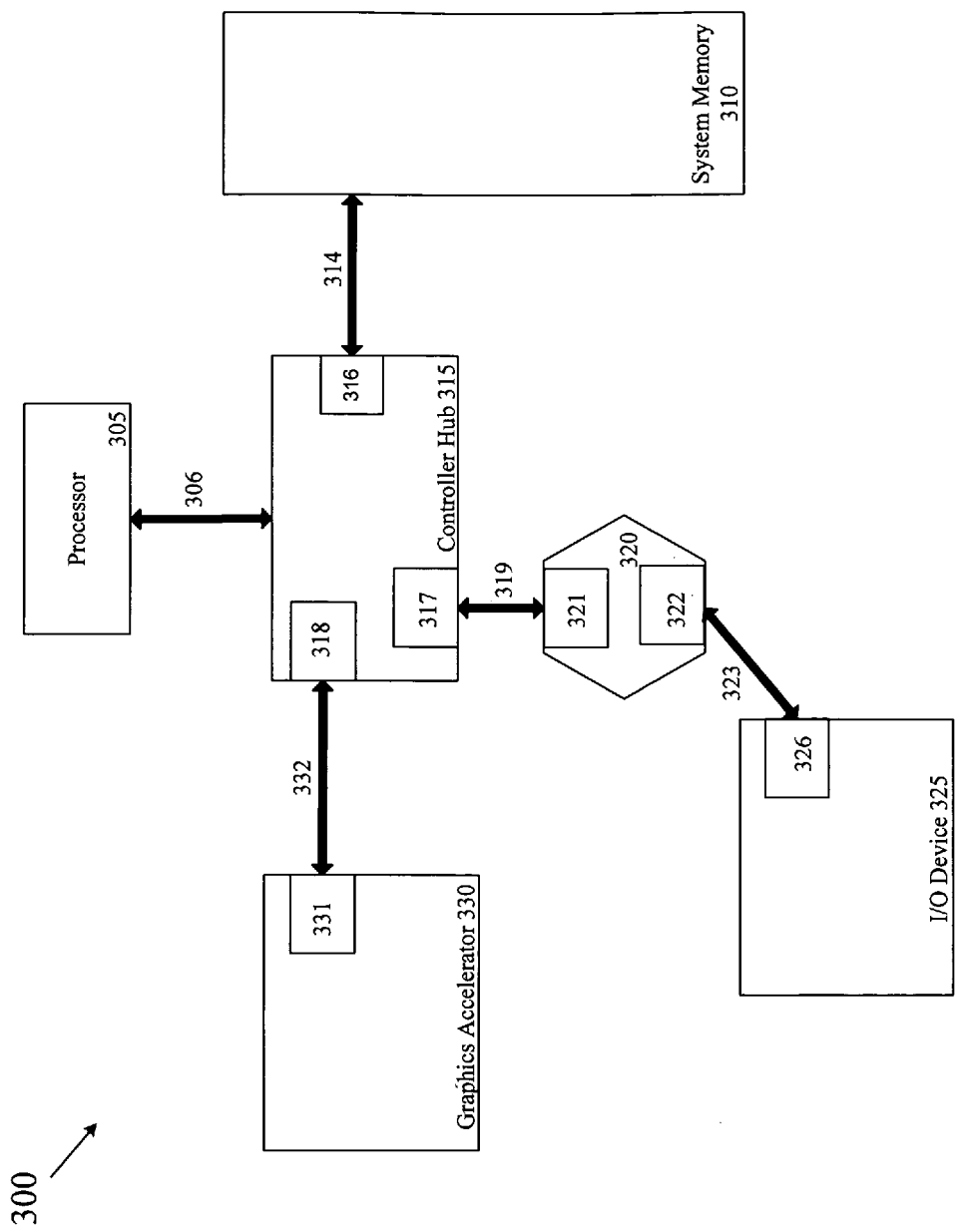
FIG. 3 is a block diagram of a system in accordance with one embodiment of the present invention.

Embodiments can be implemented in many different system types. Referring to FIG. 3, a block diagram of a system in accordance with one embodiment of the present invention is shown. System 300 includes a processor 305 and a system memory 310 coupled to a controller hub 315. Processor 305 includes any processing element, such as a microprocessor, a host processor, an embedded processor, a co-processor, or other processor. Processor 305 is coupled to controller hub 315 through a front-side bus (FSB) 306. In one embodiment, FSB 306 is a serial point-to-point (PtP) interconnect.

System memory 310 includes any memory device, such as random access memory (RAM), non-volatile (NV) memory, or other memory accessible by devices in system 300. System memory 310 is coupled to controller hub 315 through a memory interface 314.

In one embodiment, controller hub 315 is a root hub or root controller in a PCIe interconnection hierarchy. Examples of controller hub 315 include a chipset, a memory controller hub (MCH), a northbridge, an input/output controller hub (ICH), a southbridge, and a root controller/hub. Here, controller hub 315 is coupled to a switch/bridge 320 through a serial link 316, which may be a PCIe interconnect. Input/output modules 317-319, which may also be referred to as interfaces/ports, include/implement a layered protocol stack to provide communication between controller hub 315 and a corresponding component. Input/output modules 317-319 may include squelch detection circuits, each associated with a corresponding lane of respective interconnect 314, 316 and 332. Further, in accordance with one embodiment, the modules may also implement logic to dynamically detect a logical lane zero of the interconnect, and under software control or a combined hardware and software control, to enable at least the squelch detection circuit associated with the logical lane zero while disabling the remaining squelch detection circuits, when the corresponding interconnect is in a low power state, e.g., due to limited or no traffic along the interconnect.

In one embodiment, multiple devices are capable of being coupled to switch 320. Switch 320 routes packets/messages from a device 325 upstream, i.e., up a hierarchy towards controller hub 315 and downstream, i.e., down a hierarchy away from controller hub 315 to device 325. IO modules 321, 322 and 326 implement a layered protocol stack to communicate between switch 320 and controller hub 315 and device 325, respectively. Device 325 includes any internal or external device or component to be coupled to an electronic system, such as an IO device, a network interface controller (NIC), an add-in card, an audio processor, a network processor, a hard-drive, a storage device, a monitor, a printer, a mouse, a keyboard, a router, a portable storage device, a Firewire device, a Universal Serial Bus (USB) device, a scanner, and other input/output devices.

A graphics accelerator 330 is also coupled to controller hub 315 through serial link 332. In one embodiment, graphics accelerator 330 is coupled to an MCH, which is coupled to an ICH. Switch 320, and accordingly IO device 325, is then coupled to the ICH. IO modules 331 and 318 are also to implement a layered protocol stack to communicate between graphics accelerator 330 and controller hub 315.

While shown with this configuration in the embodiment of FIG. 3, other implementations are possible. For example, processor 305 may include integrated memory and input/output controllers and may be coupled to one or more semiconductor devices via PCIe or other serial links. In such implementations, processor 305 may include input/output modules incorporating power control logic for squelch detection circuitry.

Figure 4:
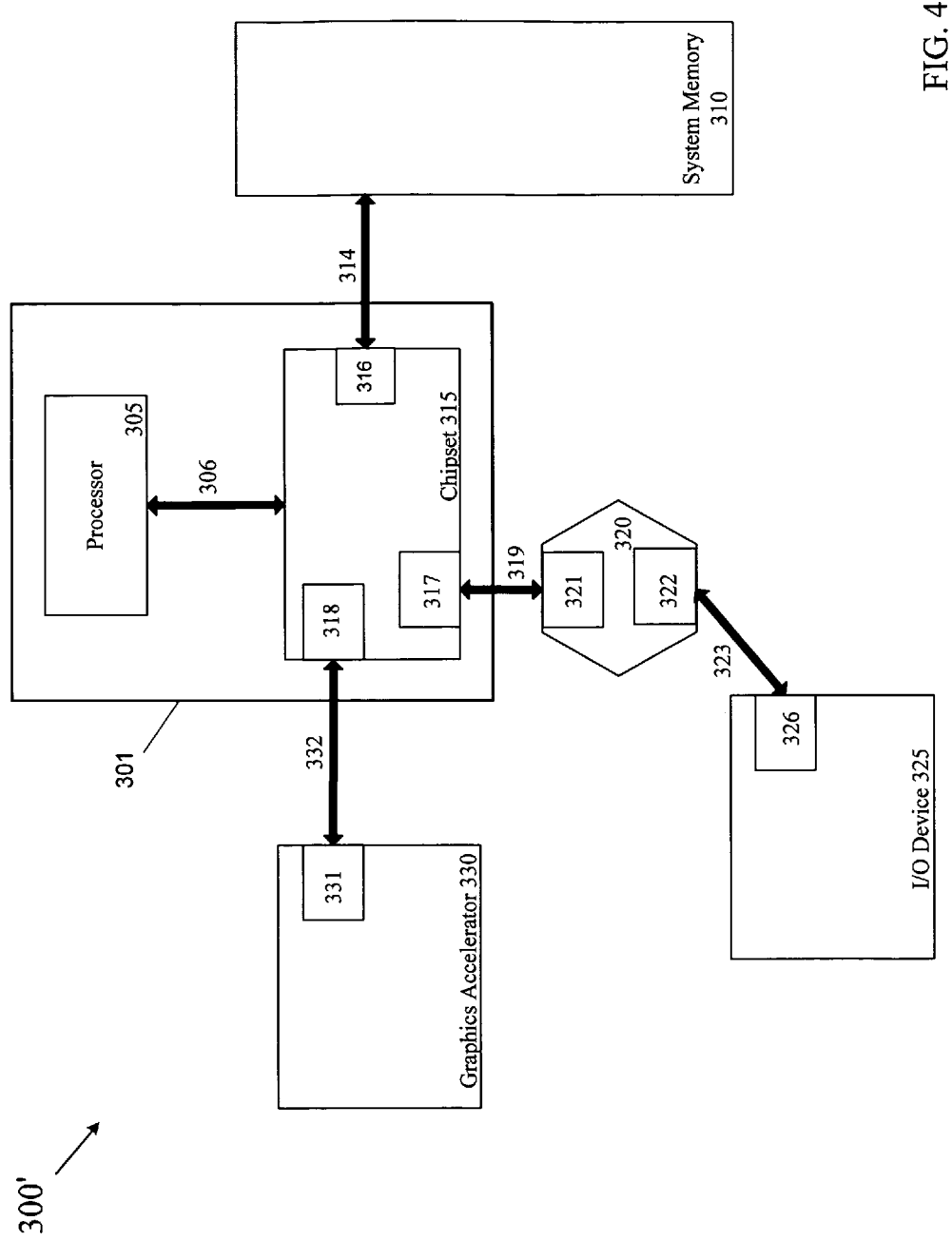
FIG. 4 is a block diagram of a system in accordance with another embodiment of the present invention.

Referring now to FIG. 4, shown is a block diagram of a system in accordance with another embodiment of the present invention. System 300' includes a MCP 301 including a processor 305, which may be a multi-core processor having multiple cores to independently execute instructions, and a chipset 315, both of which may be fabricated on a single die and coupled via an integrated link 306.

Chipset 315 may include a MCH, a northbridge, an ICH, a southbridge, and root controller/hub among other such interfaces. Here, chipset 315 is coupled to a switch/bridge 320 through a serial link 316. Input/output modules 317-319 include/implement a layered protocol stack to provide communication between chipset 315, switch/bridge 320 through link 319, system memory 310 via a memory interconnect 314, and a graphics accelerator 330 via an interconnect 332. In one embodiment, these modules each may include logic to selectively enable one or more squelch detection circuits of the module in low power via a software or combined hardware/software control mode.

As further shown in FIG. 4, switch 320 routes packets/messages from a device 325 upstream, i.e., up a hierarchy towards chipset 315 and downstream, i.e., down a hierarchy away from chipset 315 to device 325. IO modules 321, 322 and 326 implement a layered protocol stack to communicate between switch 320, chipset 315, and device 325, respectively. Device 325 may be any internal or external device or component. Graphics accelerator 330 may include an IO module 331 to implement a layered protocol stack to communicate with chipset 315.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a squelch mode control register to enable control of power to at least one squelch detect circuit associated with an interconnect according to a first mode or a second mode, the first mode corresponding to a software mode and the second mode corresponding to a combined hardware and software mode;
   a second register coupled to the squelch mode control register to receive software settings to indicate which of a plurality of squelch detect circuits, each associated with a corresponding lane of the interconnect, is to be disabled in a low power state of the interconnect;
   a detector coupled to the squelch mode control register, the detector to dynamically detect a logical lane zero of the interconnect responsive to determination of operation in the second mode from the squelch mode control register; and
   a logic to combine control signals from the second register and an output of the detector in the second mode to selectively enable at least one of the squelch detect circuits in the low power state.

2. The apparatus of claim 1, wherein the at least one enabled squelch detect circuit includes the squelch detect circuit corresponding to the dynamically detected logical lane zero.

3. The apparatus of claim 2, wherein the dynamically detected logical lane zero is to be used for retraining when the interconnect exits the low power state.

4. The apparatus of claim 1, wherein the combined control signals and detector output is to enable at least two squelch detect circuits in the low power state to increase squelch reliability.

5. The apparatus of claim 1, further comprising a plurality of drivers coupled to the logic to provide a drive signal to a corresponding squelch detect circuit when enabled by the logic.

6. The apparatus of claim 1, further comprising a physical layer logic to disable a squelch detect circuit coupled to a lane corresponding to an unconnected port.

7. The apparatus of claim 1, wherein the detector is to detect the logical lane zero in presence of a lane reversal pattern.

8. A method comprising:
   selecting a first mode or a second mode of operation based on a setting in a first register;
   disabling at least one squelch detection circuit for a corresponding lane of an interconnect when the interconnect is in a low power state based on software control in the first mode of operation corresponding to a software mode, responsive to determination of operation in the first mode;
   dynamically detecting by a dynamic detector a logical lane zero of the interconnect, and disabling at least one squelch detection circuit when the interconnect is in the low power state based on a combined hardware and software control in the second mode of operation corresponding to a combined hardware and software mode, responsive to determination of operation in the second mode of operation, wherein disabling the at least one squelch detection circuit in the second mode of operation is based on software control signals received in a second register, at least the squelch detection circuit associated with the dynamically detected logical lane zero is enabled in the low power state in the second mode of operation, and an output of the second register and an output of the dynamic detector are combined to enable the squelch detection circuit associated with the dynamically detected logical lane zero.

9. The method of claim 8, further comprising sensing activity in a lane of the interconnect coupled to the enabled squelch detection circuit when in the low power state.

10. The method of claim 9, further comprising retraining the interconnect using the dynamically detected logical lane zero responsive to the sensing.

11. The method of claim 10, further comprising enabling the disabled at least one squelch detection circuit and entering a normal power state of the interconnect after the retraining.

12. The method of claim 8, further comprising disabling the at least one squelch detection circuit in the first mode of operation based on software control signals received in the second register.

13. The method of claim 8, further comprising enabling at least two squelch detection circuits in the low power state based on a system configuration to accommodate board routing when the interconnect includes a first lane that is at least a predetermined distance from the logical lane zero.

14. A system comprising:
   a processor including a first interface circuit to interface with an interconnect, the first interface circuit including a first register to enable control of power to at least one squelch detect circuit according to a first mode or a second mode, the first mode corresponding to a software mode and the second mode corresponding to a combined hardware and software mode, a second register coupled to the first register to receive software settings to indicate which of a plurality of squelch detect circuits, each associated with a corresponding lane of the interconnect, is to be disabled in a low power state of the interconnect, a detector coupled to the first register to dynamically detect a logical lane zero of the interconnect responsive to determination of operation in the second mode from the first register, and a logic to combine control signals from the second register and an output of the detector in the second mode to selectively enable at least two squelch detect circuits in the low power state; and
   a second semiconductor device coupled to the processor via the interconnect, the second semiconductor device including a second interface circuit to interface with the interconnect.

15. The system of claim 14, wherein a first squelch detect circuit of the first interface circuit is to be enabled when no communications are to occur between the processor and the second semiconductor device, the first squelch detect circuit corresponding to the dynamically detected logical lane zero.

16. The system of claim 14, wherein one of the at least two enabled squelch detect circuits is the squelch detect circuit corresponding to the dynamically detected logical lane zero.

17. The system of claim 16, wherein the at least two squelch detect circuits are to be selectively enabled to increase squelch reliability, and the dynamically detected logical lane zero is to be used for retraining when the interconnect exits the low power state.

* * * * *